US011407859B2

(12) United States Patent
Jeol et al.

(10) Patent No.: US 11,407,859 B2
(45) Date of Patent: Aug. 9, 2022

(54) FILLED COMPOSITION CONTAINING POLYPHENYLENE SULPHIDE (PPS) AND POLYAMIDE 6 (PA6)

(71) Applicant: SOLVAY SPECIALTY POLYMERS USA, LLC, Alpharetta, GA (US)

(72) Inventors: Stéphane Jeol, Cumming, GA (US); Christopher Ward, Sandy Springs, GA (US); Vito Leo, Incourt (BE)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 259 days.

(21) Appl. No.: 16/464,826

(22) PCT Filed: Dec. 1, 2017

(86) PCT No.: PCT/EP2017/081109
§ 371 (c)(1),
(2) Date: May 29, 2019

(87) PCT Pub. No.: WO2018/100127
PCT Pub. Date: Jun. 7, 2018

(65) Prior Publication Data

US 2019/0390015 A1 Dec. 26, 2019

Related U.S. Application Data

(60) Provisional application No. 62/429,208, filed on Dec. 2, 2016.

(30) Foreign Application Priority Data

Jan. 31, 2017 (EP) .................................... 17154022

(51) Int. Cl.

| | |
|---|---|
| ***C08G 75/0209*** | (2016.01) |
| ***C08G 69/02*** | (2006.01) |
| ***C08J 9/00*** | (2006.01) |
| ***C08J 5/04*** | (2006.01) |
| ***C08L 81/04*** | (2006.01) |

(52) U.S. Cl.
CPC ......... *C08G 75/0209* (2013.01); *C08G 69/02* (2013.01); *C08J 5/043* (2013.01); *C08J 9/009* (2013.01); *C08L 81/04* (2013.01); *C08J 2381/04* (2013.01); *C08J 2451/08* (2013.01); *C08J 2477/02* (2013.01); *C08L 2203/16* (2013.01); *C08L 2203/20* (2013.01); *C08L 2203/30* (2013.01)

(58) Field of Classification Search
CPC .......... C08L 81/02; C08L 77/02; C08L 77/06; C08L 77/10; C08K 7/14; C08K 5/00
USPC .......................................................... 524/494
See application file for complete search history.

(56) References Cited

U.S. PATENT DOCUMENTS

| | | | | |
|---|---|---|---|---|
| 5,759,925 A | | 6/1998 | Ballard et al. | |
| 8,076,423 B2 | | 12/2011 | Ishio et al. | |
| 2016/0102202 A1 | * | 4/2016 | Lamberts | C08L 77/00 524/413 |
| 2016/0168380 A1 | | 6/2016 | Jeol et al. | |

FOREIGN PATENT DOCUMENTS

| | | | | | |
|---|---|---|---|---|---|
| CN | 102876040 A | | 1/2013 | | |
| CN | 102898836 A | * | 1/2013 | | |
| CN | 103450672 A | | 12/2013 | | |
| CN | 103525088 A | | 1/2014 | | |
| CN | 103755881 A | | 4/2014 | | |
| CN | 103756321 A | | 4/2014 | | |
| CN | 104072991 A | | 10/2014 | | |
| CN | 104231607 A | | 12/2014 | | |
| CN | 104861655 A | | 8/2015 | | |
| CN | 105062071 A | | 11/2015 | | |
| EP | 431954 A2 | | 6/1991 | | |
| EP | 443729 A2 | | 8/1991 | | |
| EP | 473038 A1 | | 3/1992 | | |
| EP | 2829576 A1 | * | 1/2015 | ............. | B29C 49/00 |
| JP | 05325612 A | | 12/1993 | | |
| JP | H06207103 A | | 7/1994 | | |
| JP | 2001329171 A | | 11/2001 | | |
| JP | 2016525171 A | | 8/2016 | | |
| KR | 100652968 B1 | | 11/2006 | | |
| KR | 2012069798 A | | 6/2012 | | |
| WO | WO-2015122941 A1 | * | 8/2015 | ............. | C08L 81/04 |

OTHER PUBLICATIONS

Murphy J., in “Additives for Plastics Handbook”, 2nd Edition, 2001, Chapter 5.2.3., p. 43-48—Elsevier Advanced Technology.

Tang W. et al., “Toughening and compatibilization of polyphenylene sulfide/nylon 66 blends with SEBS and maleic anhydride grafted SEBS triblock copolymers”, Journal of Applied Polymer Science, 2007, vol. 106, pp. 2648-2655—Wiley Periodicals Inc.

* cited by examiner

*Primary Examiner* — Deve V Hall

(74) *Attorney, Agent, or Firm* — Beatrice C. Ortego

(57) ABSTRACT

The present invention relates to a polymer composition (C) comprising: —a polyphenylene sulfide (PPS), —at least 3 wt. % of polyamide 6 (PA6), —25 to 60 wt. % of reinforcing agents, —3 to 8 wt. % of a functionalized, non-aromatic elastomer, wherein the weight ratio PPS/PA6 is at least 4 and wherein wt. % are based on the total weight of the composition. The present invention also relates to articles incorporating the polymer composition and the use of polyamide 6 (PA6) as a heat-aging stabilizer in a polymer composition.

16 Claims, No Drawings

FILLED COMPOSITION CONTAINING POLYPHENYLENE SULPHIDE (PPS) AND POLYAMIDE 6 (PA6)

RELATED PATENT APPLICATIONS

This application claims priority to U.S. application No. 62/429,208 filed on Dec. 2, 2016 and to European patent application No. EP 17154022 filed on Jan. 31, 2017, the whole content of each of these applications being incorporated herein by reference for all purposes.

TECHNICAL FIELD

The present invention relates to a polymer composition comprising polyphenylene sulfide (PPS), polyamide 6 (PA6), reinforcing agents and a functionalized, non-aromatic elastomer, wherein the weight ratio of PPS/PA6 is at least 4. The present invention also relates to articles incorporating the polymer composition. These articles not only present good mechanical properties after fabrication, but also present a substantial retention of these mechanical properties after long term exposure to high temperature (i.e. long term high temperature stability).

BACKGROUND ART

Polymer compositions are commonly used to manufacture articles for the automotive, electrical and electronic industries, for example as engine parts and electronic parts. Submitted to high temperatures for long period of times, these articles not only have to present good mechanical properties after fabrication, but also have to retain a sufficient percentage of these properties over time. Polymer compositions to be used in these technology fields thus have to present a complex set of technical properties which notably includes, impact resistance, tensile strength and heat aging stability.

The applicant has identified a polymer compositions comprising polymeric components and non-polymeric components which, when added in certain amounts and ratios in the composition, resolve all of the abovementioned technical requirements for use of the automotive, electrical and electronic industries. This polymer composition comprises a combination of at least four components: a polyphenylene sulfide (PPS), at least 3 wt. % of polyamide 6 (PA6), 25 to 60 wt. % of reinforcing agents and 3 to 8 wt. % of a specific elastomer, wherein the weight ratio PPS/PA6 is at least 4.

Several prior art documents relates to polymer composition comprising a blend of polyarylenesulfide (PAS) and polyamide (PA).

One of them, EP 0443729 A2 relates to thermoplastic compositions comprising (a) a poly arylene sulfide, (b) a polyamide, and (c) an unsaturated carboxylic acid-modified, hydrogenated conjugated diene/monovinyl aromatic block copolymer, preferably styrene-based and in an amount ranging between 10 to 50 wt. %.

EP 0473038 A1 relates to a composition comprising (1) a resin matrix consisting essentially of a blend of a polyarylene sulfide resin and a polyamide resin and (2) an impact strength improving amount of an impact strength improver resulting from a combination of a polyolefin elastomer and at least one unsaturated carboxylic acid anhydride.

JP2001329171 A2 relates to a polymer material comprising a mixture of polyamide resin and a polyphenylene sulfide resin, 1-30 wt. % of polymer modified with rubber or derivatives thereof, unsaturated carboxylic acid or anhydride, the polymer being mixed with 0.5 to 5 wt. % of epoxy resin (notably phenolic epoxy resins).

U.S. Pat. No. 8,076,423 describes a process for producing a polyphenylene sulfide resin composition including melt-kneading about 99 to about 60 wt. % of a polyphenylene sulfide resin (a) and about 1 to about 40 wt. % of a polyamide resin (b), and about 0.1 to 10 parts by weight of a compatibilizing agent (c) per 100 parts by weight in total of the polyphenylene sulfide resin (a) and the polyamide resin (b).

CN102876040 A discloses a composite material which comprises, by weight, 10-40 parts of polyphenylene sulfide, 10-40 parts of polyamide, 5-25 parts of carbon fibers, 10-50 parts of fillers, 5-20 parts of compatilizers, 0.2-1.5 parts of coupling agents, 0-1 part of antioxidants, 0-1 part of light stabilizers and 0-1 parts of processing additives.

CN104231607 A relates to a polymer blend material prepared from the following components by weight: 600-800 parts of nylon 6, 200-400 parts of polyphenylene sulfide, 5-15 parts of a surfactant, 10-100 parts of a compatibilizer, 10-50 parts of an oxidant and 30-200 parts of filler.

CN105062071 A relates to a polymer plastic alloy including the following components: 55-65 wt. % of PPS resin, 10-15 wt. % of PA6 resin, 10-15 wt. % of short glass fibers, 1-2 wt. % of a surface treating agent, 0.5-1 wt. % of a nucleating agent, 0.5-1 wt. % of a cross-linking agent, 2-5 wt. % of a toughener, 0.5-1 wt. % of a filler, 0.5-1 wt. % of an enhancer, 0.1-0.5 wt. % of an anti-aging agent, 0.5-1 wt. % of a dispersant, 0.5-1 wt. % of a stabilizer and 5-10 wt. % of a flame retardant.

The article of Tang W et al. (Journal of Applied Polymer Science, 106:2648-2655, 2007) describes the use of styrene-b-ethylene/butylene-b-styrene triblock copolymer (SEBS) and maleic anhydride grafted SEBS (SEBS-g-MA) as compatibilizers for the blends of polyphenylene sulfide/nylon 66 (PPS/PA66).

None of the above-listed documents describe a polymer composition according to the present invention, comprising a specific weight ratio of polyphenylene sulfide (PPS) and polyamide 6 (PA6), as well as from 25 to 60 wt. % of reinforcing agents and 3 to 8 wt. % of a specific elastomer (i.e. non-aromatic and functionalized). The applicant has found that such a composition advantageously presents, when used to prepare shaped articles, a mechanical property profile and heat aging stability which make the articles well suited for, e.g. the automotive, electrical or electronic industries.

SUMMARY OF INVENTION

The present invention relates to a polymer composition (C) comprising:

a polyphenylene sulfide (PPS), at least 3 wt. % of polyamide 6 (PA6), 25 to 60 wt. % of reinforcing agents, 3 to 8 wt. % of a functionalized, non-aromatic elastomer, wherein the weight ratio PPS/PA6 is at least 4 and wherein wt. % are based on the total weight of the composition.

The applicant has found that the composition of the present invention provides an effective, cost-effective solution to the above-stated technical constraints required by the automotive, electrical or electronic markets: tensile strength, impact resistance and heat aging stability (e.g. after 1000 hours at 200° C.).

Polyphenylene Sulfide Polymer (PPS)

The polymer composition (C) comprises a polyphenylene sulfide polymer (PPS). The PPS is according to the present invention the polymeric component present in the higher amount in the composition (C).

According to the present invention, a "polyphenylene sulfide polymer (PPS)" denotes any polymer of which at least about 50 mol. % of the recurring units are recurring units ($R_{PPS}$) of formula (L) (mol. % are herein based on the total number of moles in the PPS polymer):

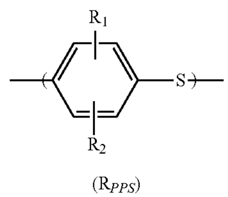

wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains.

According to an embodiment of the present invention, at least about 60 mol. %, at least about 70 mol. %, at least about 80 mol. %, at least about 90 mol. %, at least about 95 mol. %, at least about 99 mol. % of the recurring units in the PPS are recurring units ($R_{PPS}$) of formula (L).

The mol. % are based are based on the total number of moles in the PPS.

According to an embodiment of the present invention, the polyphenylene sulfide polymer denotes any polymer of which at least 50 mol. % of the recurring units are recurring units ($R_{PPS}$) of formula (L) wherein $R_1$ and $R_2$ are hydrogen atoms. For example, the PPS polymer is such that at least about 60 mol. %, at least about 70 mol. %, at least about 80 mol. %, at least about 90 mol. %, at least about 95 mol. %, at least about 99 mol. % of the recurring units in the PPS are recurring units ($R_{PPS}$) of formula (L) wherein $R_1$ and $R_2$ are hydrogen atoms.

According to an embodiment of the present invention, the PPS polymer is such that about 100 mol. % of the recurring units are recurring units ($R_{PPS}$) of formula (L):

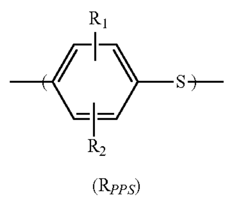

wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains, or wherein $R_1$ and $R_2$ are hydrogen atoms.

According to this embodiment, the PPS polymer consists essentially of recurring units ($R_{PPS}$) of formula (L).

PPS is notably manufactured and sold under the trade name Ryton® PPS by Solvay Specialty Polymers USA, LLC.

According to the present invention, the weight average molecular weight of the PPS may be from 30,000 to 70,000 g/mol, for example from 35,000 to 60,000 g/mol. The weight average molecular weight can be determined by gel permeation chromatography (GPC) using ASTM D5296 with polystyrene standards.

According to an embodiment of the present invention, the polymer composition comprises at least 30 wt. % of PPS, based on the total weight of the polymer composition (C). For example, the polymer composition comprises at least 35 wt. % of PPS, at least 38 wt. % of PPS, at least 40 wt. % of PPS or at least 42 wt. % of PPS.

According to an embodiment of the present invention, the polymer composition comprises less than 60 wt. % of PPS, based on the total weight of the polymer composition (C). For example, the polymer composition comprises less than 58 wt. % of PPS, less than 55 wt. % of PPS, less than 52 wt. % of PPS or less than 50 wt. % of PPS.

According to an embodiment of the present invention, the polymer composition comprises from 30 to 60 wt. % of PPS, based on the total weight of the polymer composition (C). For example, the polymer composition comprises from 35 to 55 wt. % of PPS, from 38 to 52 wt. % of PPS, from 40 to 50 wt. % of PPS or from 42 to 48 wt. % of PPS.

Polyamide 6 (PA6)

The polymer composition (C) comprises a polyamide 6 (PA6).

A "polyamide 6 (PA6)" denotes any polymer of which at least about 50 mol. % of the recurring units are recurring units ($R_{PA6}$) of formula (N) (mol. % are herein based on the total number of moles in the PA6 polymer):

$$—NH—(CH_2)_5—CO— \quad (N)$$

According to one embodiment of the present invention, the polyamide PA6 is such that at least about 60 mol. %, at least about 70 mol. %, at least about 80 mol. %, at least about 90 mol. %, at least about 95 mol. %, at least about 99 mol. % of the recurring units ($R_{PA6}$) are of formula (N).

The mol. % are based are herein based on the total number of moles in the PPS.

According to one embodiment, recurring units ($R_{PA6}$) are obtained from lactam or aminoacids having the structure $NH_2$—$(CH_2)_5$—COOH.

The polyamide PA6 of the present invention may comprise recurring units different from recurring units ($R_{PA6}$). For example, it may comprise recurring units ($R_{PA*}$), resulting from the condensation product of:

- at least one diacid [acid (DA)] (or derivatives thereof), and
- at least one diamine [amine (NN)] (or derivatives thereof).

According to this embodiment, the diacid [acid (DA)] can be chosen among a large variety of aliphatic or aromatic components comprising at least two acidic moieties —COOH and can notably comprise heteroatoms (e.g. O, N or S). According to this embodiment, the diamine [amine (NN)] can be chosen among a large variety of aliphatic or aromatic components comprising at least two amine moieties —$NH_2$ and can notably comprise heteroatoms (e.g. O, N or S).

According to an embodiment of the present invention, the recurring units ($R_{PA*}$) are according to formula (E):

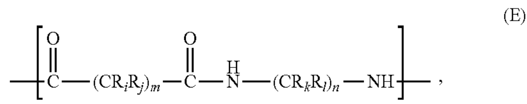

wherein:

each $R_i$, $R_j$, $R_k$, and $R_l$ on each carbon atom is independently selected from a hydrogen, a halogen, an alkyl, an alkenyl, an ether, a thioether, an ester, an amide, an imide, an alkali or alkaline earth metal sulfonate, an alkyl sulfonate, an alkali or alkaline earth metal phosphonate, an alkyl phosphonate, an amine, an quaternary ammonium, and any combination thereof;

m is an integer from 0 to 10;

n is an integer from 6 to 12.

According to another embodiment, the recurring units ($R_{PA*}$) result from the condensation of:

at least one aliphatic diacid ($DA_{al}$) or derivative thereof (acid halogenides, especially chlorides, acid anhydrides, acid salts, acid amides), and at least one aromatic diamine ($NN_{ar}$) or derivative thereof.

According to another embodiment, the recurring units ($R_{PA*}$) result from the condensation of:

at least an aromatic diacid ($DA_{ar}$), or derivative thereof or at least an aliphatic diamine ($NN_{al}$), or derivative thereof.

Non limitative examples of aromatic diamines ($NN_{ar}$) are notably m-phenylene diamine (MPD), p-phenylene diamine (PPD), 3,4'-diaminodiphenyl ether (3,4'-ODA), 4,4'-diaminodiphenyl ether (4,4'-ODA) p-xylylene diamine (PXDA) and m-xylylenediamine (MXDA).

Non limitative examples of aliphatic diacids ($DA_{al}$) are notably oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecanedioic acid [HOOC—$(CH_2)_{10}$—COOH] and tridecanedioic acid [HOOC—$(CH_2)_{11}$—COOH].

Non limitative examples of aliphatic diamines ($NN_{al}$) are notably 1,2-diaminoethane, 1,2-diaminopropane, propylene-1,3-diamine, 1,3-diaminobutane, 1,4-diaminobutane (putrescine), 1,5-diaminopentane (cadaverine), 2-methyl-1,5-diaminopentane, hexamethylenediamine, 3-methylhexamethylenediamine, 2,5 dimethylhexamethylenediamine, 2,2,4-trimethyl-hexamethylenediamine, 2,4,4-trimethyl-hexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane and N,N-Bis (3-aminopropyl)methylamine.

Non limitative examples of aromatic diacids ($DA_{ar}$) are notably phthalic acids, including isophthalic acid (IPA), terephthalic acid (TPA), naphthalendicarboxylic acids (e.g. naphthalene-2,6-dicarboxylic acid), 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis (3-carboxyphenyl)methane, 2,2-bis(3-carboxyphenyl) hexafluoropropane, 2,2-bis(3-carboxyphenyl)ketone, bis(3-carboxyphenoxy)benzene.

According to the present invention, the weight average molecular weight of the PA6 may be from 5,000 to 50,000 g/mol, for example from 10,000 to 40,000 g/mol. The weight average molecular weight can be determined by gel permeation chromatography (GPC) using ASTM D5296 with polystyrene standards.

According to an embodiment of the present invention, the polymer composition comprises at least 3 wt. % of PA6, based on the total weight of the polymer composition (C). For example, the polymer composition comprises at least 5 wt. % of PA6, at least 5.5 wt. % of PA6, at least 6 wt. % of PA6 or at least 6.5 wt. % of PA6.

According to an embodiment of the present invention, the polymer composition comprises less than 20 wt. % of PA6, based on the total weight of the polymer composition (C). For example, the polymer composition comprises less than 15 wt. % of PA6, less than 12 wt. % of PA6, less than 11 wt. % of PA6 or less than 10 wt. % of PA6.

According to an embodiment of the present invention, the polymer composition comprises from 3 to 15 wt. % of PA6, based on the total weight of the polymer composition (C). For example, the polymer composition comprises from 5 to 12 wt. % of PA6, from 5.5 to 11 wt. % of PA6, from 6 to 10 wt. % of PA6 or from 6.5 to 9 wt. % of PA6.

Weight Ratio PPS/PA6

The polymer composition comprises both PPS and PA6 as above described in a weight ratio PPS/PA6 which is at least about 4. This means that the weight ratio PPS/PA6 can be equal to about 4 or can be greater than 4.

According to one embodiment of the present invention, the weight ratio PPS/PA6 is at least about 4.5. This means that the weight ratio PPS/PA6 can be equal to about 4.5 or can be greater than 4.5.

According to another embodiment of the present invention, the weight ratio PPS/PA6 is at least about 5. This means that the weight ratio PPS/PA6 can be equal to about 5 or can be greater than 5.

According to yet another embodiment of the present invention, the weight ratio PPS/PA6 is at least about 5.5. This means that the weight ratio PPS/PA6 can be equal to about 5.5 or can be greater than 5.5.

According to one embodiment of the present invention, the weight ratio PPS/PA6 is less than about 20, for example less than about 18, less than about 16 or less than about 14.

Functionalized, Non-Aromatic Elastomer

The composition (C) of the present invention comprises 3 to 8 wt. % of a functionalized, non-aromatic elastomer.

In the context of the present invention, an "elastomer" is defined as a polymeric material presenting: (1) a low glass transition temperature ($T_g$), that is to say a glass transition temperature below 25° C., below 0° C. or even below −25° C., and (2) a low modulus (Young's Modulus), that is to say a modulus below 200 MPa or even below 100 MPa.

The polymer backbone of the elastomer of the present invention is non-aromatic. For the sake of clarity, the backbone does not comprise an aryl and arylene group (or moiety), e.g. a styrene group (or moiety). The backbone of the elastomer may for example be an olefin (co)polymer and can notably be selected from elastomeric backbones comprising polyethylenes copolymers, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA) or mixture of one or more of the above.

The elastomers of the present invention are grafted polymer backbones, also called similarly in the context of the present invention functionalized elastomer backbones. The functionalization of the backbone can result from the copolymerization of monomers which include the functionalization or from the grafting of the polymer backbone with a further component.

Specific examples of functionalized non-aromatic elastomer according to the present invention are notably terpolymers of ethylene, acrylic ester and glycidyl methacrylate; copolymers of ethylene and butyl ester acrylate; copolymers of ethylene, butyl ester acrylate and glycidyl methacrylate; ethylene-maleic anhydride copolymers; EPR grafted with maleic anhydride; EPDM grafted with maleic anhydride (EPDM-g-MAH) or mixture of one or more of the above. Examples of commercially available functionalized aliphatic elastomers according to the present invention are Exxelor® polymer resins (e.g. Exxelor® VA 1801) from Exxon Mobil and Lotader® polymer resins (Lotader® 8840) from Arkema.

According to an embodiment of the present invention, the functionalization of the elastomer consists in a maleic anhydride functionalization.

According to an embodiment of the present invention, the functionalized, non-aromatic elastomer is EPDM grafted with maleic anhydride (EPDM-g-MAH).

The functionalized, aliphatic elastomer may be present in the composition (C) in a total amount of greater than about 3 wt. %, greater than 3.5 wt. % or greater than 4 wt. %, based on the total weight of the composition (C). The functionalized, non-aromatic elastomer may be present in the composition (C) in a total amount of less than about 8 wt. %, less than 7.5 wt. %, less than 7 wt. % or less than 6.5 wt. %, based on the total weight of the polymer composition (C).

According to the present invention, the polymer composition (C) does not comprise an aromatic elastomer or comprise such a polymer in an amount not exceeding 1 wt. %, for example not exceeding 0.5 or not exceeding 0.1 wt. %, based on the total weight of the polymer composition (C). Examples of such aromatic elastomers which are, according to this embodiment, excluded from the polymer composition of the present invention are notably acrylonitrile-butadiene-styrene rubbers (ABS); block copolymers styrene ethylene butadiene styrene (SEBS); block copolymers styrene butadiene styrene (SBS); core-shell elastomers of methacrylate-butadiene-styrene (MBS) type, or mixture of one or more of the above.

According to an embodiment, the weight ratio PA6/elastomer is at least equal about 1. This means that, according to this embodiment, PA6 and the elastomer, as above-described, are present in the polymer composition (C) in quantities such that the weight ratio PA6/elastomer is equal to about 1 or is greater than 1.

According to another embodiment of the present invention, the weight ratio PA6/elastomer is at least about 1.2. This means that the weight ratio can be equal to about 1.2 or can be greater than 1.2.

According to yet another embodiment of the present invention, the weight ratio PA6/elastomer is at least about 1.3. This means that the weight ratio can be equal to about 1.3 or can be greater than 1.3.

Reinforcing Agents

The composition (C) also comprises 25 to 60 wt. % of reinforcing agents, based on the total weight of the composition (C).

The reinforcing agents, also called reinforcing fibers or fillers, may be selected from fibrous and particulate reinforcing agents. A fibrous reinforcing filler is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50.

The reinforcing filler may be selected from mineral fillers (such as talc, mica, kaolin, calcium carbonate, calcium silicate, magnesium carbonate), glass fibers, carbon fibers, synthetic polymeric fibers, aramid fibers, aluminum fibers, titanium fibers, magnesium fibers, boron carbide fibers, rock wool fibers, steel fibers and wollastonite.

Among fibrous fillers, glass fibers are preferred; they include chopped strand A-, E-, C-, D-, S- and R-glass fibers, as described in chapter 5.2.3, p. 43-48 of Additives for Plastics Handbook, 2nd edition, John Murphy. Preferably, the filler is chosen from fibrous fillers. It is more preferably a reinforcing fiber that is able to withstand the high temperature applications.

The reinforcing agents may be present in the composition (C) in a total amount of greater than 25 wt. %, greater than 30 wt. % by weight, greater than 35 wt. % or greater than 40 wt. %, based on the total weight of the polymer composition (C). The reinforcing agents may be present in the composition (C) in a total amount of less than 65 wt. %, less than 60 wt. %, less than 55 wt. % or less than 50 wt. %, based on the total weight of the polymer composition (C).

The reinforcing filler may for example be present in the composition (C) in an amount ranging between 25 and 60 wt. %, for example between 30 and 50 wt. %, based on the total weight of the polymer composition (C).

Optional Components

The composition (C) may also comprises optional components, for example selected from the group consisting of plasticizers, colorants, pigments (e.g. black pigments such as carbon black and nigrosine), antistatic agents, dyes, lubricants (e.g. linear low density polyethylene, calcium or magnesium stearate or sodium montanate), thermal stabilizers, light stabilizers, flame retardants, nucleating agents and antioxidants.

The composition (C) may also comprise one or more other polymers. Mention can be made notably of polyaryletherketones or other polyamides (e.g. polyphthalamides).

According to an embodiment of the present invention, the polymer composition (C) does not comprise an aromatic epoxy polymer or comprise such a polymer in an amount not exceeding 1 wt. %, for example not exceeding 0.5 or not exceeding 0.1 wt. %, based on the total weight of the polymer composition (C). Examples of such aromatic epoxy polymers which are, according to this embodiment, excluded from the polymer composition of the present invention are notably epoxy resins based on bisphenol-A, bisphenol-F, tetrabromobisphenol-A, phenol novolac, cresol novolac, amino phenol, methylene dianiline, isocyanuric acid, or mixture of one or more of the above.

Preparation of the Composition (C)

The invention further pertains to a method of making the composition (C) as above detailed, said method comprising melt-blending the polymers, the reinforcing agents, and the elastomer, optionally any other components or additives.

Any melt-blending method may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Articles

The present invention also relates to the articles comprising the polymer composition (C) of the present invention, described above.

Examples of articles are films, laminates, automotive parts, engine parts, electrical parts and electronics parts.

According to the present invention, the articles manufactured from the polymer composition (C) of the present invention not only present good mechanical properties after fabrication, but also present a substantial retention of these mechanical properties after long term exposure to high temperature, for example after a 500-hour or a 1000-hour exposure at 200° C.

The long-term heat stability of the articles can be assessed by exposure (air oven ageing) of test samples at test temperatures in an oven for test periods of time. The test samples are tested for tensile strength at break and impact resistance before and after air oven ageing. The comparison of the obtained values provides a percentage of retention of tensile strength at break and impact resistance, and thus the various compositions can be assessed as to long-term heat stability performance.

The retention of mechanical properties (%) after long term exposure to high temperature can be assessed by exposure of moulded test samples at a specific temperature (e.g. 200° C.) for a specific period of time (e.g. 500 hours, 1000 hours, 2000 hours or 3000 hours), the initial and final values being measured and compared according to the following equation:

$$100(MPf-MPi)/MPi$$

wherein:

MPf is the value of the mechanical property measured after long term exposure to high temperature and MPi is the value of the mechanical property measured of the unexposed article.

For example, the retention of tensile strength at break (%) after long term exposure to high temperature is assessed according to the following equation:

$$100(TSi-TSf)/TSi$$

wherein:

TSf is the value of the tensile strength measured after long term exposure to high temperature and TSi is the value of the tensile strength measured of the unexposed article.

As another example, the retention of impact resistance (%) after long term exposure to high temperature is assessed according to the following equation:

$$100(IRi-IRf)/IRi$$

wherein

IRf is the value of the impact resistance measured after long term exposure to high temperature and IRi is the value of the impact resistance of the unexposed article.

The articles of the present invention may, for example, retain more than 50% of tensile strength at break (e.g. according to ISO 527-2) after a 500-hour or a 1000-hour exposure at 200° C. They may retain more than 60%, more than 70% or even more than 80% of tensile strength at break after a 500-hour or a 1000-hour exposure at 200° C.

The articles of the present invention may, for example, retain more than 50% of impact resistance (e.g. ISO Unnotched Izod according to ISO 180) after a 500-hour or a 1000-hour exposure at 200° C. They may retain more than 60%, more than 70% or even more than 80% of impact resistance after a 500-hour or a 1000-hour exposure at 200° C.

The present invention also relates to a method for manufacturing an article by shaping the composition (C) of the invention. The article can be manufactured according to any shaping technique, such as for example extrusion, injection moulding, thermoform moulding, compression moulding, blow moulding or additive manufacturing like Fused Filament Fabrication (FFF) or Selective Laser Sintering (SLS). The article of the present invention is for example shaped by injection moulding.

Use of the Polymer Composition (C) and Articles

The polymer composition (C) of the present invention can be used to manufacture articles presenting a heat aging stability, in particular a substantial retention of mechanical properties after long term exposure to temperature of 200° C. Heat exposure of this kind can notably take place in automotive under-the-hood parts.

According to an embodiment of the present invention, the polymer composition (C) is used to manufacture articles in which:

$$100(TSi-TSf)/TSi \geq 50$$

wherein

TSf is the value of the tensile strength measured after long term exposure (e.g. 500 hours, 1000 hours, 2000 hours or 3000 hours) to high temperature (e.g. 200° C.) and TSi is the value of the tensile strength measured of the unexposed article.

According to another embodiment of the present invention, the polymer composition (C) is used to manufacture articles in which:

$$100(TSi-TSf)/TSi \geq 60,$$

$$100(TSi-TSf)/TSi \geq 70,$$

$$100(TSi-TSf)/TSi \geq 80, \text{ or}$$

$$100(TSi-TSf)/TSi \geq 85.$$

According to an embodiment of the present invention, the polymer composition (C) is used to manufacture articles in which:

$$100(IRi-IRf)/IRi \geq 50$$

wherein

IRf is the value of the impact resistance measured after long term exposure (e.g. 500 hours, 1000 hours, 2000 hours or 3000 hours) to high temperature (e.g. 200° C.) and IRi is the value of the impact resistance of the unexposed article.

According to another embodiment of the present invention, the polymer composition (C) is used to manufacture articles in which:

$$100(IRi-IRf)/IRi \geq 60,$$

$$100(IRi-IRf)/IRi \geq 70,$$

$$100(IRi-IRf)/IRi \geq 80, \text{ or}$$

$$100(IRi-IRf)/IRi \geq 85.$$

The composition (C), as disclosed above, is accordingly useful in increasing long-term thermal stability at high temperatures of articles made from the composition (C).

The present invention also relates to the use of the above disclosed composition (C) for high temperature applications.

Use of Polyamide 6 (PA6)

The present invention also relates to the use of polyamide 6 (PA6) as a heat-aging stabilizer in a polymer composition. In the context of the present invention, a "heat-aging stabilizer" can be defined as a component providing to the composition incorporating it the ability to retain at least 50% of its initial tensile strength at break (as measured according to ISO 527-2) or at least 50% of its initial impact resistance (as measured according to ISO 180) after exposure to a temperature of at least 200° C. during at least 500 hours.

According to an embodiment of the present invention, the polyamide 6 (PA6), used as a heat-aging stabilizer, provides to the composition incorporating it the ability to retain at least 60% of the initial tensile strength at break, or at least 70%, at least 80% or at least 85% of the initial tensile strength at break (as measured according to ISO 527-2) after an exposure of at least 500 hours (or at least 1000 hours or at least 2000 hours) to a temperature of at least 200° C. (or at least 210° C. or at least 220° C.).

According to another embodiment of the present invention, the polyamide 6 (PA6), used as a heat-aging stabilizer, provides to the composition incorporating it the ability to retain at least 60% of the impact resistance at break, or at least 70%, at least 80% or at least 85% of the impact resistance (as measured according to ISO 180) after an exposure of at least 500 hours (or at least 1000 hours or at least 2000 hours) to a temperature of at least 200° C. (or at least 210° C. or at least 220° C.).

According to this aspect of the invention, the polyamide 6 (PA6) is as described above, notably in terms of composition, structure and content in the polymer composition (C).

According to an embodiment, the present invention also relates to the use of polyamide 6 (PA6) as a heat-aging stabilizer in a polymer composition comprising polyphenylene sulfide (PPS), for example comprising 35 to 60 wt. % of a polyphenylene sulfide (PPS).

According to another embodiment, the present invention also relates to the use of polyamide 6 (PA6) as a heat-aging stabilizer in a polymer composition comprising polyphenylene sulfide (PPS) and reinforcing agents, for example comprising 35 to 60 wt. % of a polyphenylene sulfide (PPS) and 25 to 60 wt. % of reinforcing agents.

According to another embodiment, the present invention also relates to the use of polyamide 6 (PA6) as a heat-aging stabilizer in a polymer composition comprising polyphenylene sulfide (PPS), reinforcing agents, for example comprising 35 to 60 wt. % of a polyphenylene sulfide (PPS), 25 to 60 wt. % of reinforcing agents and 3 to 8 wt. % of a functionalized, non-aromatic elastomer, as described above.

According to these embodiments, the PA6 may be present in the polymer composition in a ratio PPS/PA6 of at least 2, 2.5, 3, 3.5, 4, 4.5, 5 or 5.5.

The present invention also relates to a process for stabilizing heat-aging of a polymer composition, comprising adding an effective amount of polyamide 6 (PA6). In the context of the present invention, "stabilizing heat-aging" means:

- retaining at least 50% of the initial tensile strength at break (or at least 60%, at least 70%, at least 80% or at least 85% of the initial tensile strength at break, as measured according to ISO 527-2) after an exposure of at least 500 hours (or at least 1000 hours or at least 2000 hours), to a temperature of at least 200° C. (or at least 210° C. or at least 220° C.), and/or
- retaining at least 50% of the initial impact resistance (or at least 60%, at least 70%, at least 80% or at least 85% of the initial impact resistance, as measured according to ISO 180 after an exposure of at least 500 hours (or at least 1000 hours or at least 2000 hours), to a temperature of at least 200° C. (or at least 210° C. or at least 220° C.)

According to this embodiment:

- the polymer composition may comprise polyphenylene sulfide (PPS), for example comprising 35 to 70 wt. % of a polyphenylene sulfide (PPS), and/or
- the polymer composition may comprise reinforcing agents, for example 25 to 60 wt. % of reinforcing agents,
- the polymer composition may comprise a functionalized, non-aromatic elastomer, for example 3 to 8 wt. % of a functionalized, non-aromatic elastomer, and/or
- the PA6 may be present in the polymer composition in a ratio PPS/PA6 of at least 2, 2.5, 3, 3.5, 4, 4.5, 5 or 5.5.

Should the disclosure of any patents, patent applications, and publications which are incorporated herein by reference conflict with the description of the present application to the extent that it may render a term unclear, the present description shall take precedence.

EXAMPLES

Raw Materials

PPS Ryton® QA281 N (Solvay)

PA 6 AK270 (Shaw Industries)

PA 66 Stabamid®27AE1 (Solvay)

Glass Fibers T779H (Nippon)

Lotader® AX8840 (Arkema), copolymer of ethylene and glycidyl methacrylate (epoxy functionalized)

Exxelor® VA1801 (Exxon Mobil), ethylene copolymer functionalized with maleic anhydride (EPDM-g-MAH)

Kraton® FG-1901 (Kraton), triblock copolymer based on styrene and ethylene/butylene functionalized with maleic anhydride (SEBS-g-MAH)

Irganox® 1010 (BASF), an antioxidant

HDPE (High Density Polyethylene) 6007G (Chevron Phillips), a lubricant

Compounding

Compounding that involved the incorporation of glass fibers was performed on a Coperion ZSK-26 R&D twin-screw extruder (26 mm extruder). The neat PPS resin was fed into barrel 1. Glass fibers were fed at barrel 7. Optional ingredients when present were also included into barrel 1, possibly pre-mixed before being fed into barrel 1.

Barrel conditions were specified in order to achieve a melt temperature between 310° C. and 340° C. Screw speeds were set at 200 RPM. Feed rates were set according to the desired composition of each formulation.

The molten strands were cooled and crystallized in a water bath before being pelletized for further processing.

Molding

All compounds were molded into ISO Type IA tensile bars.

Testing

Tensile properties were tested according to ISO 527-2 using the ISO Type IA tensile bars.

Impact properties were tested using ISO Unnotched Izod (ISO 180), at room temperature, using ISO Type IA tensile bars.

Heat aging was performed by exposing test samples in an air oven regulated at 200° C. and removed after designated time intervals, to be subsequently tested at room temperature for tensile and impact properties.

The components and their respective amounts in the compositions (according to the present invention or comparative) and the mechanical properties of the same are reported in Tables below.

Example 1

TABLE 1

| | 1 | C1 | C2 |
|---|---|---|---|
| | Components (wt. %) | | |
| PPS | 54.12 | 58.39 | 48.98 |
| PA6 | 9.13 | 9.86 | 8.27 |
| Glass fibers | 30 | 30 | 30 |
| Lotader ® AX8840 | 6 | 1 | 12 |
| HDPE 6007G | 0.25 | 0.25 | 0.25 |
| Irganox ® 1010 | 0.5 | 0.5 | 0.5 |
| | Impact and Tensile properties | | |
| Unnotched Izod Impact resistance (KJ/m$^2$) | 51.2 ± 2.45 | 30.9 ± 2.36 | 53.7 ± 3.17 |
| Tensile stress at break (MPa) | 163 ± 0.91 | 168 ± 1.99 | 147 ± 1.06 |

Example 1 provides a good compromise in tensile strength and impact resistance that is not achievable when the concentration of elastomer Lotader® AX8840 is lower than 3 wt. % or higher than 8%.

Example 2

TABLE 2

| | 2 | 3 | C3 | C4 |
|---|---|---|---|---|
| PPS | 51.75 | 54.12 | 45.18 | 49.19 |
| PA6 | 11.5 | 9.13 | 18.07 | 14.06 |
| Glass fibers | 30 | 30 | 30 | 30 |
| Lotader ® AX8840 | 6 | 6 | 6 | 6 |
| HDPE 6007G | 0.25 | 0.25 | 0.25 | 0.25 |
| Irganox ® 1010 | 0.5 | 0.5 | 0.5 | 0.5 |
| PPS/PA6 ratio | 4.5 | 5.9 | 2.5 | 3.5 |
| Unnotched Izod Impact resistance (KJ/m$^2$) | 42.7 ± 4.05 | 51.2 ± 2.45 | 34.2 ± 1.1 | 33.2 ± 2.21 |
| Tensile stress at break (MPa) | 158 ± 2.13 | 163 ± 0.91 | 150 ± 2.89 | 152 ± 0.78 |

Example 2 demonstrates that better impact resistance and tensile stress at break are obtained when the PPS/PA6 weight ratio is greater than 4 (examples 2 & 3). When the weight ratio of PPS/PA6 is less than 4 (examples C3 & C4), impact resistance and tensile stress at break have lower values.

Example 3

TABLE 3

| | 4 | C5 |
|---|---|---|
| | Components (wt. %) | |
| PPS | 54.12 | 69.52 |
| PA6 | 9.13 | 11.73 |
| Glass fibers | 30 | 12 |
| Lotader ® AX8840 | 6 | 6 |

TABLE 3-continued

| | 4 | C5 |
|---|---|---|
| HDPE 6007G | 0.25 | 0.25 |
| Irganox ® 1010 | 0.5 | 0.5 |
| | Impact and Tensile properties | |
| Unnotched Izod Impact resistance (KJ/m$^2$) | 51.2 ± 2.45 | 29.7 ± 2.58 |
| Tensile stress at break (MPa) | 163 ± 0.91 | 107 ± 2.26 |

Interestingly, the composition providing the highest impact resistance and tensile strength is the one having a concentration of glass fibers greater than 25 wt. %

Example 4

TABLE 4

| | 5 | C6 | 6 | C7 |
|---|---|---|---|---|
| | Components (wt. %) | | | |
| PPS | 54.8 | 54.8 | 54.8 | 54.8 |
| PA6 | 9.25 | — | 9.25 | — |
| PA66 | — | 9.25 | | 9.25 |
| Glass fibers | 30 | 30 | 30 | 30 |
| Lotader ® AX8840 | 5.2 | 5.2 | — | — |
| Exxelor ® VA1801 | — | — | 5.2 | 5.2 |
| HDPE 6007G | 0.25 | 0.25 | 0.25 | 0.25 |
| Irganox ® 1010 | 0.5 | 0.5 | 0.5 | 0.5 |
| | Impact and Tensile properties | | | |
| Unnotched Izod Impact resistance (KJ/m$^2$) | 45.6 ± 1.91 | 33.8 ± 1.61 | 41.4 ± 2.14 | 32.4 ± 3.34 |
| Tensile stress at break (MPa) | 150 ± 1.89 | 141 ± 0.71 | 146 ± 2.07 | 138 ± 2.23 |

Surprisingly, the combination of elastomer (Lotader® AX8840 or Exxelor® VA1801) and PA6 provides better results in terms of impact resistance and tensile strength at break than the combination of elastomer and PA66.

Example 5

TABLE 5

| | C8 | C9 |
|---|---|---|
| | Components (wt. %) | |
| PPS | 54.25 | 64.25 |
| PA6 | 10 | — |
| Glass fibers | 30 | 30 |
| Kraton ® FG-1901 | 5 | 5 |
| HDPE 6007G | 0.25 | 0.25 |
| Irganox ® 1010 | 0.5 | 0.5 |
| | Impact and Tensile properties | |
| Unnotched Izod Impact resistance (KJ/m$^2$) | 32.4 ± 4.13 | 36.4 ± 1.46 |
| Tensile stress at break (MPa) | 141 ± 3.16 | 128 ± 2.01 |

An aromatic-containing elastomer (Kraton® FG-1901) does not provide good impact resistance to the PPS glass-filled compounds (example C8). The addition of PA6 to this formulation (example C9) further does not improve the impact resistance. This example demonstrates that aromatic-containing elastomers are not suitable in combination with PPS glass-filled compounds or upon further addition of PA6.

Example 6

TABLE 8

| | 7 | C9 |
|---|---|---|
| | Components (wt. %) | |
| PPS | 54.25 | 64.25 |
| PA6 | 10 | — |
| Glass fibers | 30 | 30 |
| Lotader ® AX8840 | 5 | 5 |
| HDPE 6007G | 0.25 | 0.25 |
| Irganox ® 1010 | 0.5 | 0.5 |
| | Impact and Tensile properties | |
| Unnotched Izod Impact resistance (KJ/m$^2$) T0 | 43.9 ± 0.82 | 35.9 ± 3.92 |
| Unnotched Izod Impact resistance (KJ/m$^2$) T1 = 1000 hours heat aging at 200° C. | 28.2 ± 2.63 | 18.7 ± 0.81 |
| Heat aging - Impact Resistance Retention (%) | 64.2 | 52.1 |
| Tensile stress at break (MPa) T0 | 144 ± 1.73 | 141 ± 2.71 |
| Tensile stress at break (MPa) T1 = 1000 hours heat aging at 200° C. | 133 ± 2.05 | 114 ± 3.11 |
| Heat aging - Tensile Strength at break Retention (%) | 92.4 | 80.9 |

Surprisingly, the addition of PA6 to the composition comprising PPS/elastomer/glass fibers shows an unexpected increase in the long-term high-temperature resistance.

The invention claimed is:

1. A polymer composition comprising:

a polyphenylene sulfide (PPS), at least 3 wt. % of polyamide 6 (PA6), from 25 to 60 wt. % of reinforcing agents, from 3 to 8 wt. % of a functionalized, non-aromatic elastomer, wherein the weight ratio PPS/PA6 is at least 4 and less than about 18, and wherein wt. % are based on the total weight of the composition.

2. The polymer composition of claim 1, wherein the PPS comprises at least about 50 mol. % of recurring units ($R_{PPS}$) of formula (L):

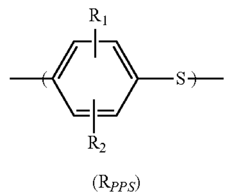

($R_{PPS}$)

wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains, wherein mol. % is based on the total number of moles in the PPS.

3. The polymer composition of claim 1, wherein the PA6 comprises at least about 50 mol. % of recurring units ($R_{PA6}$) of formula (N):

$$\text{—NH—}(CH_2)_5\text{—CO—}$$

wherein mol. % is based on the total number of moles in the PA6.

4. The polymer composition of claim 1 comprising from 35 to 60 wt. % of PPS.

5. The polymer composition of claim 1 comprising from 5 to 12 wt. % of PA6.

6. The polymer composition of claim 1, wherein the elastomer is functionalized with maleic anhydride.

7. The polymer composition of claim 1, wherein the elastomer is EPDM grafted with maleic anhydride (EPDM-g-MAH).

8. The polymer composition of claim 1, wherein the weight ratio of PA6/elastomer is at least 1.

9. A method of making the polymer composition of claim 1, said method comprising melt-blending PPS, PA6, the reinforcing agents, and the functionalized, non-aromatic elastomer, and optionally any other components or additives.

10. An article comprising the polymer composition of claim 1.

11. The article of claim 10, wherein the article is a film, a laminate, an automotive part, an engine part, an electrical part, or an electronic part.

12. A method of heat-stabilizing the polymer composition of claim 1 comprising adding the polyamide 6 (PA6) as a heat-aging stabilizer in the polymer composition.

13. The method of claim 12, wherein the polymer composition comprises:

from 35 to 70 wt. % of a polyphenylene sulfide (PPS), from 25 to 60 wt. % of reinforcing agents, with the proviso that the composition either does not comprise an elastomer or comprises an elastomer in an amount not exceeding 1 wt. %, wherein wt. % are based on the total weight of the composition.

14. The method of claim 12, wherein the PA6 comprises at least about 50 mol. % of recurring units ($R_{PA6}$) of formula (N):

$$\text{—NH—}(CH_2)_5\text{—CO—}$$

wherein mol. % is based on the total number of moles in the PA6.

15. The method of claim 12, wherein the PA6 in the composition ranges from 5 to 15 wt. %, based on the total weight of the composition.

16. The polymer composition of claim 1, wherein the weight ratio PPS/PA6 is less than about 16.

* * * * *